A. E. H. J. THOELLDEN.
DRIVING MECHANISM.
APPLICATION FILED DEC. 13, 1909.
979,223.
Patented Dec. 20, 1910.
2 SHEETS—SHEET 1.
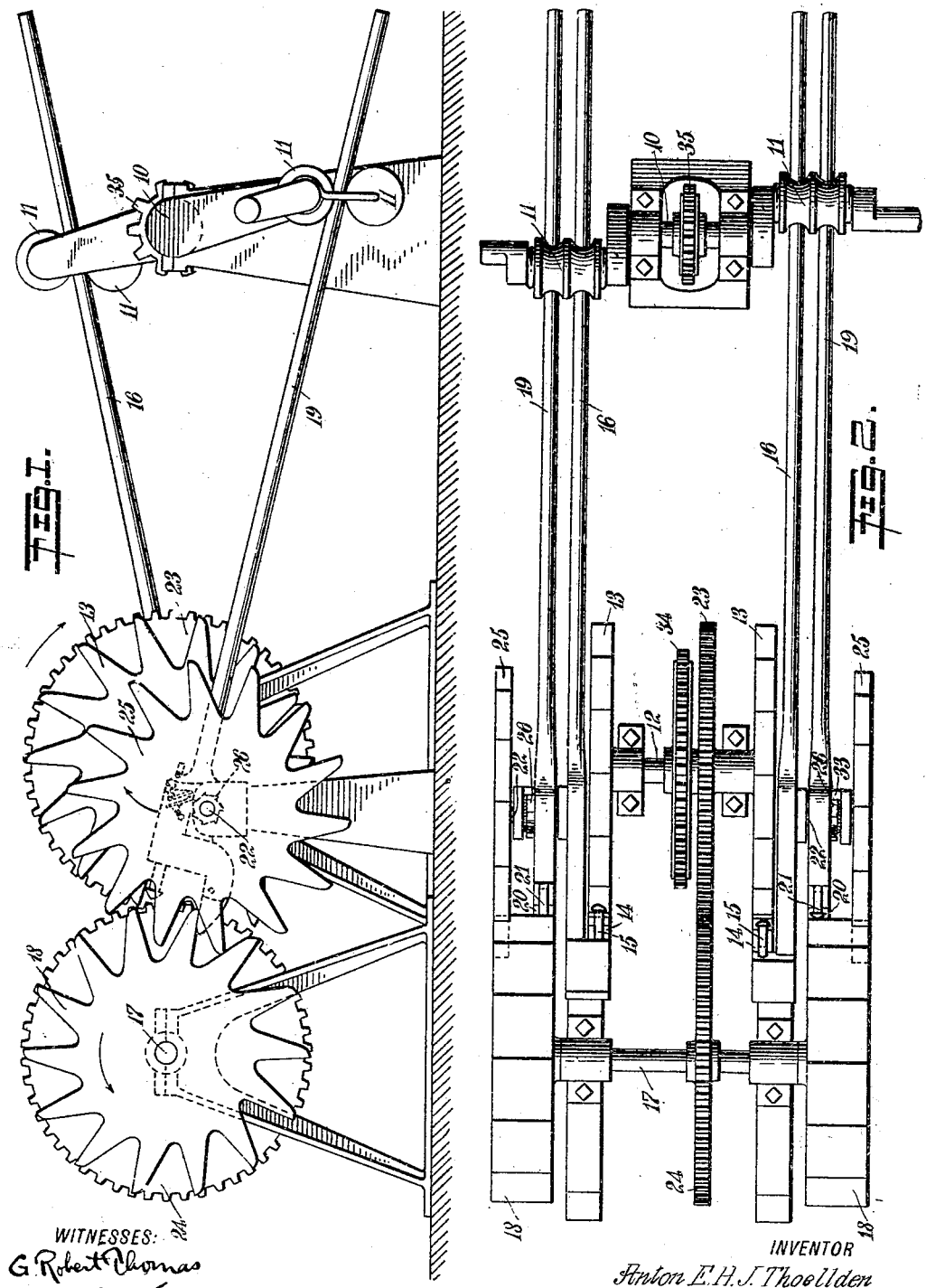
INVENTOR
Anton E. H. J. Thoellden A. E. H. J. THOELLDEN.
DRIVING MECHANISM.
APPLICATION FILED DEC. 13, 1909.
979,223.
Patented Dec. 20, 1910.
2 SHEETS—SHEET 2.
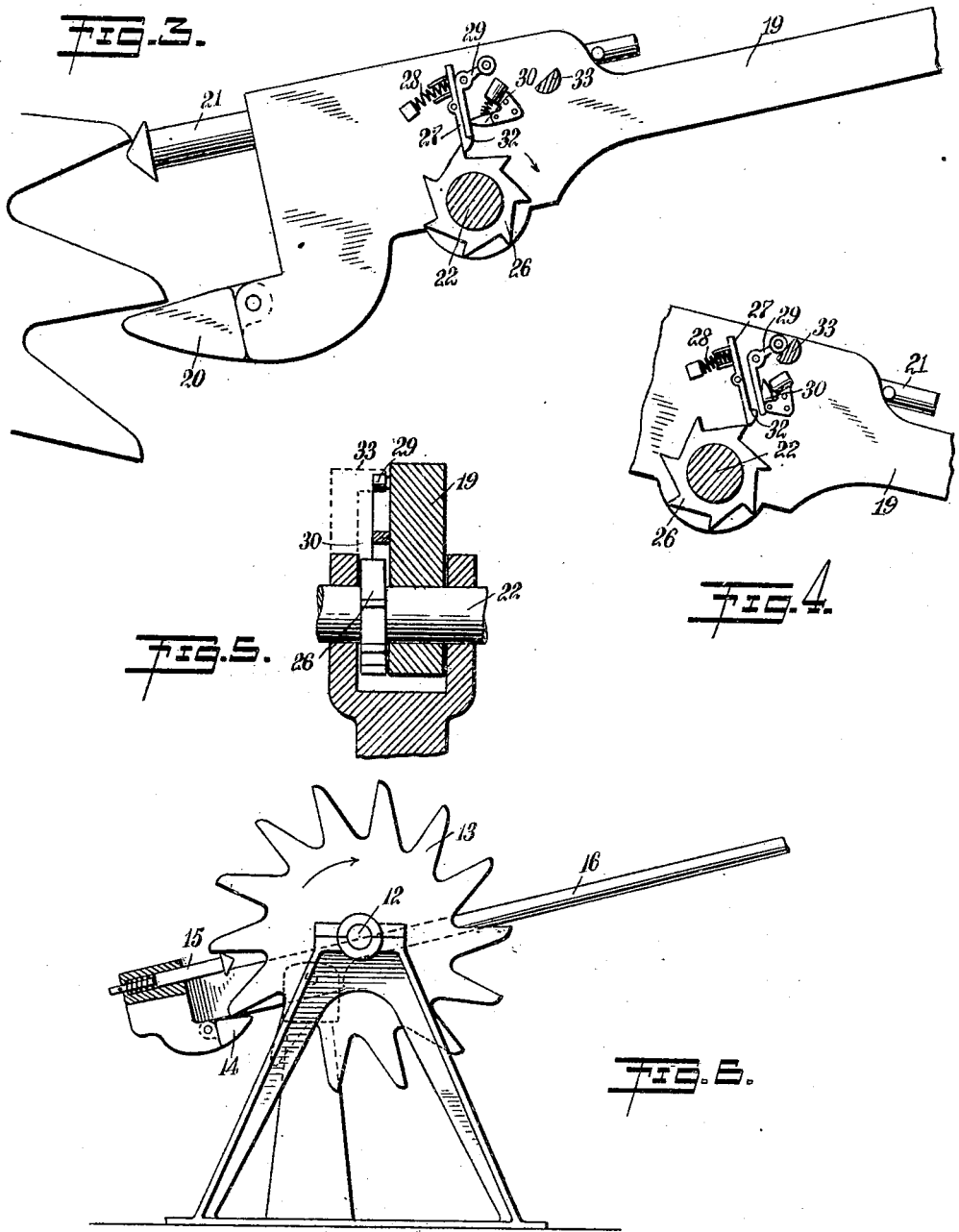
WITNESSES:
INVENTOR
Anton E. H. J. Thoellden
BY 
ATTORNEYS

UNITED STATES PATENT OFFICE.

ANTON EDWARD HENRY JULIUS THOELLDEN, OF NEW HAVEN, CONNECTICUT.

DRIVING MECHANISM.

979,223.     Specification of Letters Patent.     Patented Dec. 20, 1910.

Application filed December 13, 1909. Serial No. 532,720.

*To all whom it may concern:*

Be it known that I, ANTON E. H. J. THOELLDEN, a citizen of the United States, and a resident of New Haven, in the county of New Haven and State of Connecticut, have invented a new and Improved Driving Mechanism, of which the following is a full, clear, and exact description.

The invention is an improvement in driving mechanisms of the character disclosed in Letters Patent Number 653,123, granted to me July 3, 1900, wherein a power shaft is driven from a crank shaft through levers and ratchet wheels, the ratchet wheels being fixed to the power shaft, and the levers operatively connected to the crank shaft to swing oppositely, and having means to engage the teeth of the ratchet wheels and drive the power shaft. In the patented construction it is possible for the power shaft to revolve faster than it is driven by the levers, which is objectionable when the mechanism is applied to a vehicle, as when the latter is running down grade. This is overcome in the present invention.

Reference is to be had to the accompanying drawings forming a part of this specification, in which similar characters of reference indicate corresponding parts in all the views.

Figure 1 is a side elevation of a power mechanism constructed in accordance with my improvements; Fig. 2 is a plan of the same; Fig. 3 is a fragmentary sectional view of the mechanism; Fig. 4 is a sectional view of a part of the structure shown in Fig. 3, with the parts in a relatively different position; Fig. 5 is a cross-section through the lever shown in Figs. 3 and 4, and adjacent parts; and Fig. 6 is a fragmentary side view of a part of the mechanism, partly in section.

A crank shaft 10 is journaled in a suitable support and has cranks at opposite sides reversely arranged, each crank having roller bearings 11, two sets being shown, each set comprising a grooved roller journaled on the crank, and a corresponding roller suspended from the crank and arranged under the first roller. A power shaft 12 has ratchet wheels 13 secured to its opposite ends, the teeth of each ratchet wheel being engaged by a vertically-swinging pawl 14, and a spring-pressed pin 15 carried by a lever 16, the lever being fulcrumed intermediate its length, with its inner end extending between the grooved rollers of one of the cranks. As best shown in Fig. 6, the pawls 14 and spring-pressed pins 15 are arranged at the forward sides of the ratchet wheels, with the pawl and spring-pressed pin of each lever spaced apart substantially the distance between the adjacent teeth of the engaged ratchet wheel, the spring-pressed pin being arranged above the pawl and operating as an abutment to prevent the back lash of the wheels when the pawl of the opposite wheel is returning to a driving position. The spring-pressed pins further serve to give the ratchet wheels an initial movement preparatory to the engagement of the pawls.

An auxiliary shaft 17 has ratchet wheels 18 attached at its opposite ends, the wheels, as shown, being relatively wider than the ratchet wheels 13, and spread farther apart. Levers 19 are provided with vertically swinging pawls 20 and spring-pressed pins 21, similar to the pawls 14 and spring-pressed pins 15 of the levers 16, and operatively arranged at the inner sides of the ratchet wheels 18, the levers being fulcrumed on shafts 22, with their inner end portions passing between the remaining sets of roller bearings of the cranks. The power shaft 12 is operatively connected to the auxiliary shaft in any suitable way, such as the directly intermeshing gears 23 and 24, respectively secured to the shafts. To each of the shafts 22 is secured a ratchet wheel or gear 25, and a ratchet wheel 26, the gear meshing with the adjacent ratchet wheel 18, and the ratchet wheel 26 being engaged by a pawl 27, which, as best shown in Figs. 3 and 4, is pressed by a spring 28 to bear against the shoulders presented by the ratchet teeth. Arranged to engage the pawl and lock it against movement is a bell-crank lever 29, which in turn is engaged by a spring-pressed finger 30, the finger, bell crank lever and pawl being carried by the actuating lever 19. The inner arm of the lever is designed to extend along the back of the pawl to each side of the latter's fulcrum and engage at its lower end a shoulder 32 presented by the pawl, so that any tendency to turn the pinion 26 relatively to the pawl at certain periods will be effectually resisted. The finger or projection 33, shown in Figs. 3 and 4 to be carried by the bearing in which the shaft 22 is journaled, is arranged in the path of the outer arm of the lever 29, so that when the inner arm of the actuating lever 19 is moved downwardly, the lever 29 is disengaged from the pawl 27, as shown in Fig. 4, and permits the escape of one tooth of the ratchet wheel 26, it of course being understood that these wheels have one-half the number of teeth as the ratchet wheels 18, so as to work in harmony with the pawls 20 and spring-pressed pins 21 of the actuating levers 19. As a tooth of the ratchet wheel 26 passes under the pawl 27, the latter is immediately returned by its spring into engagement with the next adjacent tooth and is again locked by the bell-crank lever as the actuating lever moves upwardly, the bell-crank lever being returned to operative position, as also the finger 30 by the finger's spring. When the crank shaft is driven in either direction, the ratchet wheels are caused to revolve in the direction indicated by the arrows. If the power shaft tends to revolve faster than it is driven by the actuating levers 16, it is obviously resisted by the pawl and ratchet mechanism, as shown in Figs. 3, 4 and 5, since the power shaft is geared with the auxiliary shaft and the auxiliary shaft geared with the ratchet wheels 26. If desired, the ratchet wheels 13 and actuating levers 16 may be dispensed with. It is, however, desirable that both sets of levers and ratchet wheels be employed, since it gives a positive and uniform action. I have shown a ratchet or gear 34 attached to the power shaft 12, and a similar gear or ratchet 35 attached to the crank shaft, which may be used for imparting the power from the mechanism to different appliances, as set out in my patent above referred to.

Having thus described my invention, I claim as new and desire to secure by Letters Patent:

1. The combination of a power shaft having ratchet wheels, a crank shaft, levers operatively connected to the crank shaft and having means to engage the teeth of the ratchet wheels and drive the power shaft, and a pawl and ratchet mechanism to prevent the power shaft from turning faster than it is driven through the ratchet wheels by the lever.

2. The combination of a power shaft, an auxiliary shaft operatively connected to the power shaft, ratchet wheels carried by one of said shafts, levers having means to operatively engage the ratchet wheels and drive the shaft carrying the ratchet wheels, a ratchet wheel operatively connected to the first mentioned ratchet wheel, and a pawl and lever mechanism carried by one of said levers, arranged to engage the last-named ratchet wheel and prevent the rotation of the lever-actuating shaft faster than it is driven through the ratchet wheels which it carries.

3. The combination of a shaft, a ratchet wheel attached to the shaft, an oscillatory lever having means to operatively engage the ratchet wheel and drive the shaft in one direction, a ratchet wheel operatively connected with the first-named ratchet wheel, and a pawl and lever mechanism carried by said lever and arranged to engage the last-named ratchet wheel and prevent the rotation thereof faster than it is driven by the lever.

4. The combination of a shaft, a ratchet wheel carried by the shaft, a shaft geared with the first mentioned shaft, a ratchet wheel secured to the second shaft, a lever fulcrumed on the second shaft and having means to engage and drive the first ratchet wheel in one direction, and means carried by the lever and arranged to engage the second ratchet wheel and prevent the rotation faster in the said direction than it is actuated by the lever.

5. The combination of a shaft, a ratchet wheel secured to the shaft, a ratchet wheel geared to the shaft, a lever fulcrumed concentrically to the second-named ratchet wheel and having means to operatively engage the first-named ratchet wheel and drive the shaft in one direction, a pawl carried by the lever and arranged to engage the second ratchet wheel, a lever carried by the first-named lever arranged to engage the pawl and lock it in engagement with the teeth of the ratchet wheel when the first-named lever is in a certain position, and a fixed member arranged to engage the locking lever and swing it to a position to release the pawl when the first-named lever is in another position.

6. The combination of a shaft, a ratchet wheel secured to the shaft, a second ratchet wheel geared to the shaft, an actuating lever fulcrumed concentrically to the second ratchet wheel and having means to operatively engage the first ratchet wheel and drive the shaft, a spring-pressed pawl arranged to engage the teeth of the second ratchet wheel, a lever carried by the actuating lever and arranged to lock the pawl in engaging position, a finger carried by the actuating lever and arranged to lock the locking lever, and a member arranged in the path of the locking lever to swing it out of engagement with the pawl when the actuating lever is in a prescribed position.

7. The combination of a power shaft, a crank shaft having oppositely-arranged cranks, an auxiliary shaft operatively connected to the power shaft, ratchet wheels secured to both the power shaft and auxiliary shaft, and two sets of levers, with the levers of each set operatively connected to one of the cranks and having means operatively engaging the teeth of one of the ratchet wheels of each shaft.

8. The combination of a crank shaft having reversely-arranged cranks, a power shaft, an auxiliary shaft geared to the power shaft, ratchet wheels applied to both the power shaft and auxiliary shaft, two sets of actuating levers, with the levers of each set operatively connected to one of the cranks and having means to engage and drive one of the ratchet wheels of each shaft, a ratchet wheel journaled concentrically to the fulcrum of one of the levers of each set and operatively connected to one of said shafts, and means carried by the levers fulcrumed eccentrically to the last-named ratchet wheels to engage the latter and prevent the shafts from revolving faster than they are driven by the actuating levers.

9. The combination of a shaft having a ratchet wheel, a crank shaft, a lever operatively connected to the crank shaft and having means to engage the teeth of the ratchet wheel and drive the shaft, a second ratchet wheel journaled concentrically to the fulcrum of the lever and in mesh with the first-named ratchet wheel, a third ratchet wheel fixed relatively to the second ratchet wheel, and a pawl and lever mechanism to prevent the revolution of the first ratchet wheel faster than it is driven by the actuating lever, carried by the actuating lever and operatively arranged with respect to the third ratchet wheel.

In testimony whereof I have signed my name to this specification in the presence of two subscribing witnesses.

ANTON EDWARD HENRY JULIUS THOELLDEN.

Witnesses:
 CHARLES OPPE,
 ALBERT McC. MATHEWSON.